(12) United States Patent
Yoshida

(10) Patent No.: US 7,810,310 B2
(45) Date of Patent: Oct. 12, 2010

(54) INTEGRATED COAL GASIFICATION COMBINED CYCLE PLANT

(75) Inventor: Naoshige Yoshida, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 961 days.

(21) Appl. No.: 11/638,421

(22) Filed: Dec. 14, 2006

(65) Prior Publication Data
US 2008/0141647 A1    Jun. 19, 2008

(51) Int. Cl.
F02C 3/26    (2006.01)

(52) U.S. Cl. .................. 60/39.464; 60/39.182; 60/781; 60/39.12

(58) Field of Classification Search ................ 60/39.12, 60/781, 39.182, 801, 772, 39.464, 39.5, 39.511
See application file for complete search history.

(56) References Cited

U.S. PATENT DOCUMENTS

| | | | | |
|---|---|---|---|---|
| 3,849,662 | A * | 11/1974 | Blaskowski et al. | 290/2 |
| 4,212,160 | A * | 7/1980 | Blaskowski | 60/39.12 |
| 5,265,410 | A * | 11/1993 | Hisatome | 60/39.12 |
| 5,313,913 | A * | 5/1994 | Ohshita et al. | 122/4 D |
| 5,440,873 | A * | 8/1995 | Toda et al. | 60/39.12 |
| 5,517,815 | A * | 5/1996 | Fujioka et al. | 60/39.12 |
| 5,673,634 | A * | 10/1997 | Karger et al. | 110/234 |
| 5,704,206 | A * | 1/1998 | Kaneko et al. | 60/39.12 |
| 5,765,365 | A * | 6/1998 | Fujioka et al. | 60/39.12 |
| 5,988,080 | A * | 11/1999 | Miyoshi et al. | 110/343 |
| 6,032,456 | A * | 3/2000 | Easom et al. | 60/793 |
| 6,598,399 | B2 * | 7/2003 | Liebig | 60/772 |
| 6,872,373 | B2 * | 3/2005 | Tatsuhara et al. | 423/244.03 |
| 7,029,639 | B2 * | 4/2006 | Yasutake et al. | 423/244.09 |
| 2006/0178263 | A1 * | 8/2006 | Tatsuhara et al. | 502/417 |
| 2007/0137169 | A1 * | 6/2007 | Ishigami et al. | 60/39.12 |
| 2008/0134658 | A1 * | 6/2008 | Yoshida | 60/39.12 |

(Continued)

FOREIGN PATENT DOCUMENTS

JP    57-147592 A    9/1982

(Continued)

OTHER PUBLICATIONS

Japanese Office Action dated Sep. 15, 2009, issued in corresponding Japanese Patent Application No. 2004-188888, English Translation not provided to determine its relevancy.

*Primary Examiner*—William H Rodriguez
(74) *Attorney, Agent, or Firm*—Westerman, Hattori, Daniels & Adrian, LLP

(57) ABSTRACT

An IGCC plant which can improve the power generation efficiency and which can suppress the emission of sulfur components and dust into the atmosphere is provided. The IGCC plant described above has a coal gasifier for converting pulverized coal to a syngas; an exhaust heat recovery boiler generating steam; a gas turbine system which is operated by the syngas and which supplies a combustion exhaust gas to the exhaust heat recovery boiler; a steam turbine system operated by the steam generated by the exhaust heat recovery boiler; a power generator connected to the gas turbine system and/or the steam turbine system; a desulfurization device for removing sulfur components from the combustion exhaust gas discharged from the exhaust heat recovery boiler; and a wet-type electric precipitator for removing sulfur components and dust.

4 Claims, 2 Drawing Sheets

U.S. PATENT DOCUMENTS

2008/0141646 A1* 6/2008 Yoshida .................. 60/39.12
2009/0151315 A1* 6/2009 Kamohara et al. ......... 60/39.24

FOREIGN PATENT DOCUMENTS

| JP | 7-4260 A | 1/1995 |
|---|---|---|
| JP | 7-286505 A | 10/1995 |
| JP | 2733188 B2 | 3/1998 |
| JP | 11-132056 A | 5/1999 |
| JP | 2954972 B2 | 9/1999 |
| JP | 2000-111032 A | 4/2000 |
| JP | 2000-213371 A | 8/2000 |
| JP | 2000-248285 A | 9/2000 |
| JP | 2002-159879 A | 6/2002 |
| JP | 2006-10227 A | 1/2006 |

\* cited by examiner

INTEGRATED COAL GASIFICATION COMBINED CYCLE PLANT

BACKGROUND OF THE INVENTION

1. Field of the Invention

The present invention relates to an integrated coal gasification combined cycle system plant.

This application is based on Japanese Patent Application No. 2004-188888, the content of which is incorporated herein by reference.

2. Description of Related Art

In a heretofore known integrated coal gasification combined cycle system (hereinafter referred as "IGCC" in some cases), coal as a solid fuel is converted into a gas by a coal gasifier and is then used for a gas turbine combined power generation system. The IGCC has the following advantages. For example, coal resources, which have abundant reserves, are used; compared to a conventional thermal power generation using pulverized coal, the thermal efficiency is high and the amount of emitted air pollutants such as $CO_2$ is small; and since ash is discharged in the form of glassy molten slag, the volume of the ash is decreased. Accordingly, the IGCC was developed as a main technology for future coal fired power generation.

The gas obtained by coal gasification using a coal gasifier contains sulfur components (such as $H_2S$ and COS), and hence in the IGCC, a system for removing the sulfur components is provided. In an IGCC of the related art, the sulfur components are removed by a cold gas clean-up system before the gas is combusted in a gas turbine.

However, in the cold gas clean-up, moisture and $CO_2$ contained in the syngas are partly removed, and in addition, the syngas is cooled in this step. Hence, there have been problems in that the thermal loss is increased and the power generation efficiency of the IGCC system is degraded. In addition, since the gas clean-up is performed under high-pressure conditions, the number of equipment of the gas clean-up system is increased. As a result, the clean-up system becomes complicated, and costs for maintenance and the like are increased, thus the economical efficiency is deteriorated. Furthermore, the sulfur components remaining in a gas turbine exhaust gas are partly made to react with ammonia supplied in a selective catalytic reduction (SCR) system to form ammonium sulfate particulate dust, and subsequently the dust is discharged without being removed, which is undesirable.

Accordingly, in order to overcome or avoid the above problems, an IGCC plant in which a system for removing sulfur components is disposed at an exhaust side of a gas turbine has been proposed (for example, see Japanese Patent No. 2733188 (pp. 3 to 4, FIG. 1 etc.) and Japanese Patent No. 2954972 (pp. 5 to 6, FIG. 1 etc.)).

In the IGCC plant disclosed in the above Japanese Patent No. 2733188, uncombusted char in the syngas is removed by a high-temperature dust removal system before it is combusted in the gas turbine, and the sulfur components, particularly $SO_2$, in the exhaust gas of the gas turbine are removed by the desulfurization system.

Similarly, in the IGCC plant disclosed in Japanese Patent No. 2954972, the sulfur components in the exhaust gas of the gas turbine are also removed in the desulfurization system.

However, in the IGCC plants disclosed in Japanese Patent Nos. 2733188 and 2954972, $SO_3$ and dust primarily composed of ammonium sulfate cannot be removed, and as a result, there has been a problem in that the sulfur components and the dust have not been sufficiently removed.

BRIEF SUMMARY OF THE INVENTION

Accordingly, the present invention has been conceived in order to solve the above problems, and an object of the present invention is to provide an IGCC plant which can improve the power generation efficiency and, in addition, which can suppress the emission of sulfur components and dust into the atmosphere.

To this end, in accordance with a first aspect of the present invention, there is provided an IGCC plant having: a coal gasifier configured to convert pulverized coal to a syngas; a gas turbine system which is operated by the syngas; a steam turbine system operated by steam generated by an exhaust heat recovery boiler to which a combustion exhaust gas of the gas turbine system is supplied; and a power generator connected to at least one of the gas turbine system and the steam turbine system, the IGCC plant being of flue-gas-desulfurization-type, by which the combustion exhaust gas discharged from the exhaust heat recovery boiler is desulfurized before emitted into the atmosphere, wherein the IGCC plant comprises: a desulfurization device configured to desulfurize the combustion exhaust gas discharged from the exhaust heat recovery boiler to recover a sulfur component; and a wet-type electric precipitator configured to recover a sulfur component and dust from the combustion exhaust gas discharged from the desulfurization device.

According to the above first aspect of the present invention, sulfur components (primarily $SO_2$) in the combustion exhaust gas can be removed by the desulfurization device, and sulfur components (primarily $SO_3$) in the form of particulate and dust in the combustion exhaust gas can be removed by the wet-type electric precipitator. Since $SO_3$ and ammonium sulfate can be removed from the combustion exhaust gas, the emission of sulfur components into the atmosphere can be suppressed as compared to the case of the IGCC plants disclosed in Japanese Patent Nos. 2733188 and 2954972.

In addition, compared to the case in which a cold gas clean-up system is disposed between the coal gasifier and the gas turbine system, the syngas can be supplied to the gas turbine without decreasing the temperature of the syngas. Accordingly, gas loss and thermal loss can be prevented, and as a result, the power generation efficiency of the IGCC plant can be improved.

In accordance with a second aspect of the present invention, there is provided an IGCC plant having: a coal gasifier configured to convert pulverized coal to a syngas; a gas turbine system which is operated by the syngas; a steam turbine system operated by steam generated by an exhaust heat recovery boiler to which a combustion exhaust gas of the gas turbine system is supplied; and a power generator connected to at least one of the gas turbine system and the steam turbine system, the IGCC plant being of flue-gas-desulfurization-type, by which the combustion exhaust gas discharged from the exhaust heat recovery boiler is desulfurized before emitted into the atmosphere, wherein the IGCC plant comprises a desulfurization device configured to desulfurize the combustion exhaust gas discharged from the exhaust heat recovery boiler to recover a sulfur component, and the desulfurization device includes activated carbon fibers.

According to the second aspect of the present invention, the sulfur components ($SO_2$, and $SO_3$ in the form of mist) and the dust primarily formed of ammonium sulfate in the combustion exhaust gas can be simultaneously removed by the desulfurization device including the activated carbon fibers. Since $SO_3$ and ammonium sulfate, which have been difficult to remove from the combustion exhaust gas heretofore, can be removed, the emission of the sulfur components into the atmosphere can be suppressed.

In addition, compared to the case in which a cold gas clean-up system is disposed between the coal gasifier and the gas turbine system, the syngas can be supplied to the gas turbine without decreasing the temperature of the syngas. Accordingly, gas loss and thermal loss can be prevented, and as a result, the power generation efficiency of the IGCC plant can be improved.

In addition, in the above first and second aspects of the present invention, the IGCC plant may further comprise an equipment for recovering at least char contained in the syngas, the equipment being located between the coal gasifier and the gas turbine system, and the recovered char is preferably supplied to the coal gasifier.

According to this structure, since the char contained in the syngas can be recovered and recycled to the coal gasifier, the supplied pulverized coal can be efficiently converted to syngas. Hence, the ratio of the pulverized coal used for the power generation can be increased, and as a result, the power generation efficiency can be improved.

In addition, the temperature of the fuel gas in the char removal equipment is approximately 400° C., and under this condition, a Na component and a K component contained in the syngas are condensed and are incorporated into the char. The Na and the K components incorporated into the char are recycled to the coal gasifier together with the char and are finally discharged together as a molten slag.

When the Na and K components are removed from the syngas, corrosion in the gas turbine system can be prevented. Although a large amount of sulfur components is contained in the syngas, when Na and K components are not present, the gas turbine of the gas turbine system is not corroded. Hence, even when the sulfur components are not removed from the syngas, the gas turbine system can be operated without causing any problems.

Furthermore, in the first and the second aspects of the present invention, the IGCC plant may further comprise a fan which sucks the combustion exhaust gas discharged from the gas turbine system so as to emit the combustion exhaust gas into the atmosphere.

According to this structure, it is possible to prevent the gas turbine system from being influenced by the pressure loss of the desulfurization device or the like provided for a flow path of the combustion exhaust gas. As a result, the gas turbine system can be stably and efficiently operated, and hence the power generation efficiency of the IGCC plant can be improved.

According to the IGCC plant of the present invention, since the desulfurization device and the wet-type electric precipitator are used, besides $SO_2$, $SO_3$ and ammonium sulfate can also be removed from the combustion exhaust gas, and as a result, the emission of sulfur components and dust into the atmosphere can be further suppressed.

In addition, since the syngas is supplied from the coal gasifier to the gas turbine system without passing through a cold gas clean-up system, the power generation efficiency of the IGCC plant can be improved.

DETAILED DESCRIPTION OF THE INVENTION

First Embodiment

Hereinafter, a first embodiment of an IGCC plant according to the present invention will be described with reference to FIG. 1.

Figure 1:
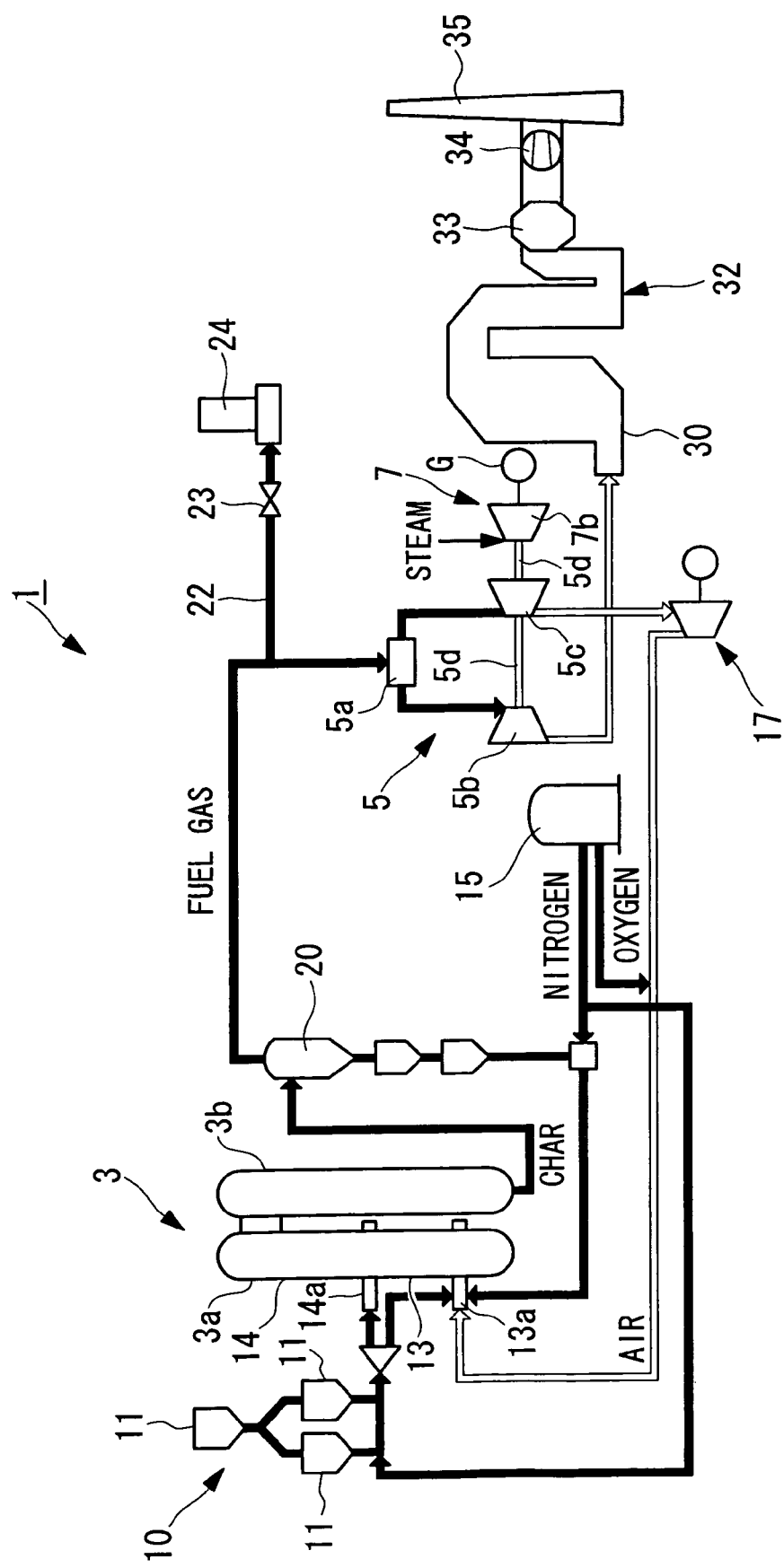
FIG. 1 is a schematic diagram showing the entire structure of an IGCC plant according to a first embodiment of the present invention.

As shown in FIG. 1, an IGCC plant 1 of this embodiment, using coal as fuel, primarily includes a coal gasifier 3, a gas turbine system 5, a steam turbine system 7, and an exhaust heat recovery boiler 30.

A coal supply system 10 for supplying pulverized coal to the coal gasifier 3 is provided at an upstream side thereof. This coal supply system 10 has a pulverizer (not shown) which pulverizes raw coal into pulverized coal having a particle size of several to several hundreds of micrometers and is designed so that the pulverized coal thus pulverized is stored in a plurality of hoppers 11.

The pulverized coal stored in the hoppers 11 is fed at a constant flow rate to the coal gasifier 3 together with nitrogen gas supplied from an air separation device 15.

The coal gasifier 3 has a coal gasification section 3a formed so that a gas flows from the lower side to the upper side and a heat exchange section 3b which is connected to the downstream side of the coal gasification section 3a and which is formed so that a gas flows from the upper side to the lower side.

In the coal gasification section 3a, a combustor 13 and a reductor 14 are provided in that order from the lower side. The combustor 13 is a portion in which the pulverized coal and char are partly combusted, and the rest is pyrolyzed into volatile components (CO, $H_2$, and lower hydrocarbons). In the combustor 13, an entrained bed is used. However, a fluidized-bed-type gasifier or a fixed-bed-type gasifier may also be used.

The combustor 13 and the reductor 14 are provided with a combustor burner 13a and a reductor burner 14a, respectively, and the pulverized coal is supplied thereto from the coal supply system 10.

The combustor burner 13a is formed so that air from an air booster compressor 17 is supplied thereto as a gasifying agent together with oxygen separated in the air separation unit 15. As described above, the configuration is designed so that air containing oxygen at a controlled concentration is supplied to the combustor burner 13a.

In the reductor 14, the pulverized coal is gasified by a high-temperature combustion gas supplied from the combustor 13. Consequently, flammable gases, such as CO and $H_2$, used as syngas are produced from the coal. The coal gasification reaction is an endothermic reaction in which carbon in the pulverized coal and char are made to react with $CO_2$ and $H_2O$ in a high-temperature gas to form CO and $H_2$.

In the heat exchange section 3b of the coal gasifier 3, a plurality of heat exchangers (not shown) is provided and is designed to generate steam using the sensible heat obtained from the syngas fed from the reductor 14. The steam generated in the heat exchangers is primarily used to drive a steam gas turbine 7b.

The gas passing through the heat exchange section 3b is fed to a char recovery equipment 20. This char recovery equipment 20 has a porous filter system, and when the gas is made to pass therethrough, char contained in the syngas is trapped and recovered. The char thus trapped is deposited on the filter to form a char layer. A Na component and a K component contained in the syngas are condensed in the char layer and are, as a result, removed in the char recovery equipment.

The char thus recovered is returned to the combustor burner 13a of the coal gasifier 3, together with the nitrogen gas separated by the air separation unit 15, for recycling.

In addition, the Na component and the K component which are returned to the combustor burner 13a together with the char are finally discharged from the lower side of the coal gasification section 3a together as molten slag formed from the pulverized coal. The discharged molten slag is rapidly cooled with water bath, followed by slag crasher system, so that a glassy slag is formed.

The syngas passing through the char recovery equipment 20 is then supplied to a combustion chamber 5a of the gas turbine system 5.

A branching path 22 is provided between the char recovery equipment 20 and the combustion chamber 5a of the gas turbine system 5, and a flare system 24 is provided downstream of this branching path 22, with a valve 23 interposed therebetween. The flare system 24 is for processing a gas having a small calorific value by combustion, which is produced during a startup stage of the coal gasifier 3.

The gas turbine system 5 has the combustion chamber 5a in which the gas obtained by gasification is combusted, a gas turbine 5b driven by the combustion gas, and a turbo compressor 5c feeding high-pressure air to the combustion chamber 5a. The gas turbine 5b and the turbo compressor 5c are connected to each other by a rotating shaft 5d. The air compressed by the turbo compressor 5c is supplied to the air booster compressor 17 in addition to the combustion chamber 5a.

A combustion exhaust gas passing through the gas turbine 5b is supplied to the exhaust heat recovery boiler 30.

The steam turbine 7b of the steam turbine system 7 is connected to the same shaft 5d as that of the gas turbine system 5, so that a so-called single-shaft combined system is formed. High-pressure steam is supplied to the steam turbine 7b from the coal gasifier 3 and the exhaust heat recovery boiler 30. In addition to the single-shaft combined system, a multi-shaft combined system may also be used.

A power generator G which outputs electricity from the rotating shaft 5d driven by the gas turbine 5b and the steam turbine 7b is provided at one side of the steam turbine system 7 opposite to that of the gas turbine system 5. However, the position of the power generator G is not limited to that described above, and the power generator G may be disposed at any position so long as an electrical output can be obtained from the rotating shaft 5d.

The exhaust heat recovery boiler 30 generates steam by the combustion exhaust gas from the gas turbine 5b, and a flue gas desulfurization (hereinafter referred to as "FGD" in some cases) device 32 is provided downstream of the combustion exhaust gas flow of the exhaust heat recovery boiler 30. This flue gas desulfurization device 32 is designed to remove the sulfur components in the exhaust gas. As an FGD 32, such as a device using limestone and gypsum or a magnesium hydroxide slurry can be used. $SO_2$ in the exhaust gas is primarily removed by this FGD 32.

A wet-type electric precipitator (wet-EP) 33 is provided at a downstream side of the combustion exhaust gas flow of the FGD 32. This wet-type electric precipitator 33 is designed to remove the sulfur components and the dust in the exhaust gas. A general wet-type electric precipitator may be used as the wet-type electric precipitator 33 in this case. $SO_3$ contained in the exhaust gas, primarily in the form of mist, and dust primarily composed of ammonium sulfate are removed by this wet-type electric precipitator 33.

An induction fan (BUF) 34 is provided downstream of the combustion exhaust gas flow of the wet-type electric precipitator 33. The combustion exhaust gas is sucked from the gas turbine system 5 by this induction fan 34, so that the combustion exhaust gas is emitted into the atmosphere via a stack 35.

Next, the operation of the IGCC plant 1 having the above structure will be described.

Raw coal is pulverized by a pulverizer (not shown) and is then fed to the hoppers 11 for storage. The pulverized coal stored in the hoppers 11 is supplied to the reductor burner 14a and the combustor burner 13a together with nitrogen separated by the air separation unit 15. Furthermore, in addition to the pulverized coal, the char recovered by the char recovery device 20 is also supplied to the combustor burner 13a.

Combustion air for the combustor burner 13a is provided from the turbo compressor 5c of the gas turbine system 5 using the air booster compressor 17, and an oxygen separated by the air separation unit 15. In the combustor 13, the pulverized coal and the char are partly combusted with the combustion air, and the rest is pyrolyzed to generate volatile components ($CO$, $H_2$, and lower hydrocarbons).

In the reductor 14, the pulverized coal supplied via the reductor burner 14a and the char from which the volatile components are discharged in the combustor 13 are gasified by a high-temperature gas rising from the combustor 13 to produce flammable gases such as $CO$ and $H_2$.

The gases passing through the reductor 14 transfer their sensible heat to the heat exchangers while passing through the heat exchange section 3b of the coal gasifier 3, so that steam is generated. The steam generated in the heat exchange section 3b is primarily used to drive the steam turbine 7b.

The gases passing through the heat exchange section 3b are fed to the char recovery equipment 20, so that char is recovered. The Na component and the K component in the gases are condensed in this step and are then incorporated into the char. The recovered char containing the Na component and the K component is returned to the coal gasifier 3.

The gases passing through the char recovery equipment 20 are fed to the combustion chamber 5a of the gas turbine system 5 and are then combusted together with the compressed air supplied from the turbo compressor 5c. The gas turbine 5b is rotated by this combustion gas, and the rotating shaft 5d is driven.

When the coal gasifier 3 is started, it is not possible to obtain a gas which has a calorific value suitable for use as fuel supplied to the combustion chamber 5a of the gas turbine system 5; hence, by opening the valve 23, a gas having a low calorific value is fed to the flare system 24 so as to be processed by combustion.

The combustion exhaust gas passing through the gas turbine 5b is fed to the exhaust heat recovery boiler 30, and by using the sensible heat of this combustion exhaust gas, steam is generated. The steam generated in the exhaust heat recovery boiler 30 is primarily used to drive the steam turbine 7b.

The steam turbine 7b is rotated by the steam from the coal gasifier 3 and the steam from the exhaust heat recovery boiler 30 to drive the rotating shaft 5d of the gas turbine system 5. The torque of the rotating shaft 5d is converted to an electrical output by the power generator G.

The combustion exhaust gas passing through the exhaust heat recovery boiler 30 is fed to the FGD 32, and the sulfur components are removed thereby. For example, when this removal is performed by a limestone/gypsum method, a limestone ($CaCO_3$) slurry mixed with water in the FGD 32 is made to react with the sulfur component ($SO_2$), so that the sulfur component is removed in the form of gypsum ($CaSO_4$).

A sulfur component ($SO_3$) in the form of mist and dust primarily composed of ammonium sulfate, which are contained in the combustion exhaust gas, are removed by the wet-type electric precipitator 33. The dust is removed by a dust precipitation function of the wet-type electric precipitator 33, and because it is in the form of mist, $SO_3$ is also removed by the same dust precipitation function of the wet-type electric precipitator 33.

The combustion exhaust gas from which the sulfur components ($SO_2$ and $SO_3$) and the dust are removed is then emitted into the atmosphere from the stack 35 via the induction fan 34. The induction fan 34 sucks the combustion exhaust gas discharged from the gas turbine system 5 and then sends it to the stack 35 by applying a pressure.

According to the structure described above, since the FGD 32 and the wet-type electric precipitator 33 are provided downstream of the combustion exhaust gas flow of the exhaust heat recovery boiler 30, the gas loss and the thermal loss caused by removing the sulfur components of the gas supplied to the gas turbine system 5 can be prevented. Hence, the ratio of energy used for the power generation of the IGCC plant 1 can be increased, and as a result, the power generation efficiency is increased.

Since the $SO_3$ in the form of mist and the dust formed of ammonium sulfate contained in the combustion exhaust gas can be removed by the wet-type electric precipitator 33, the sulfur components contained in the combustion exhaust gas discharged from the stack 35 can be decreased.

In addition, in the IGCC plant 1 of this embodiment, a so-called air-blowing method is described in which air to which oxygen is added is used as a gasifying agent. In this air-blowing IGCC plant 1, the flow rate of the gas flowing in the plant can be increased as compared to an oxygen-blowing method; for example, it is approximately twice that of the oxygen-blowing method. Since the sulfur components in the combustion exhaust gas reach the equilibrium state at a predetermined concentration (for example, at approximately 50 ppm) in case of cold clean-up system, the amount of sulfur components contained in the gas is increased as the flow rate of the gas flowing in the plant is increased. Accordingly, in the air-blowing IGCC plant 1 of this embodiment, the sulfur components in the combustion exhaust gas emitted from the stack 35 can be reduced more substantially.

The char, Na component, and K component are recovered by the char recovery equipment 20, and hence the Na component and the K component are prevented from being supplied to the gas turbine system 5. Since the gas turbine system 5 is not corroded only by the sulfur components, the gas turbine system 5 is prevented from being corroded. Accordingly, the power generation efficiency can be improved without causing any corrosion of the gas turbine of the gas turbine system 5.

By providing the induction fan 34, the gas turbine system 5 is prevented from being influenced by the pressure loss of the FGD 32 and that of the wet-type electric precipitator 33. That is, it is not necessary for the gas turbine system 5 to more strongly discharge the combustion exhaust gas to compensate for the above pressure losses, and the required load on the gas turbine system 5 for discharging the combustion exhaust gas can be decreased. As a result, the gas turbine system 5 can be stably and efficiently operated, so that the power generation efficiently of the IGCC plant 1 can be improved.

Second Embodiment

Figure 2:
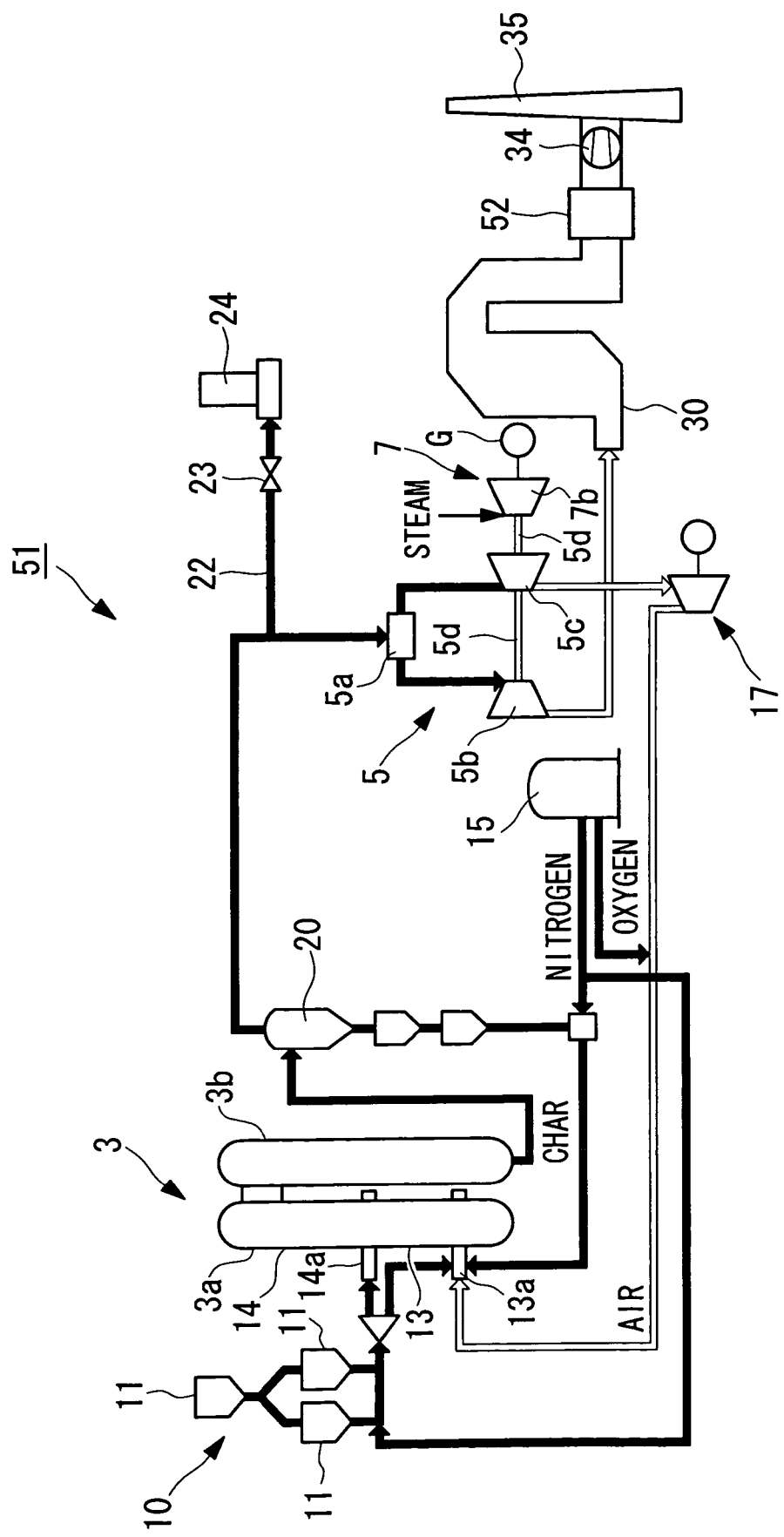
FIG. 2 is a schematic diagram showing the entire structure of an IGCC plant according to a second embodiment of the present invention.

Next, a second embodiment of the present invention will be described with reference to FIG. 2.

Although the basic structure of an IGCC plant according to this embodiment is similar to that of the first embodiment, the structure at the downstream side of the exhaust heat recovery boiler is different from that of the first embodiment. Hence, in this embodiment, only the structure at the downstream side of the exhaust heat recovery boiler is described with reference to FIG. 2, and descriptions of the coal gasifier and the like will be omitted.

In addition, the same reference numerals as in the first embodiment designate the same constituent elements of this embodiment, and a description thereof is omitted.

An IGCC plant 51 of this embodiment primarily includes the coal gasifier 3, the gas turbine system 5, the steam turbine system 7, and the exhaust heat recovery boiler 30.

An activated-carbon desulfurization device (desulfurization device) 52 is provided downstream of the combustion exhaust gas flow of the exhaust heat recovery boiler 30. The activated-carbon desulfurization device 52 includes activated carbon fibers (hereinafter referred to as "ACF" in some cases) having a catalytic function of oxidizing sulfur components. The structure is designed to remove the sulfur components ($SO_2$ and $SO_3$) and the dust in the exhaust gas with this activated-carbon desulfurization device 52.

The induction fan 34 is provided downstream of the combustion exhaust gas flow of the activated-carbon desulfurization device 52. This induction fan 34 sucks the combustion exhaust gas from the gas turbine system 5, so that the combustion exhaust gas is emitted into the atmosphere from the stack 35.

Next, the operation of the IGCC plant 51 having the above structure will be described.

The combustion exhaust gas passing through the exhaust heat recovery boiler 30 is fed to the activated-carbon desulfurization device 52, and the sulfur components and the dust in the exhaust gas are removed therein. In particular, $SO_2$ in the exhaust gas is oxidized to $SO_3$ by the catalytic function of the activated carbon fibers. The $SO_3$ obtained through the oxidation by the ACFs and $SO_2$ in the exhaust gas are made to react with water supplied to the activated-carbon desulfurization device 52 to produce sulfuric acid ($H_2SO_4$) and are then removed. In addition, the dust in the exhaust gas is also removed by the ACFs.

The combustion exhaust gas from which the sulfur components ($SO_2$ and $SO_3$) and the dust are removed is emitted into the atmosphere from the stack 35 via the induction fan 34.

According to the structure described above, the sulfur components ($SO_2$, and $SO_3$ in the form of mist) and the dust primarily formed of ammonium sulfate in the combustion exhaust gas can be removed by the activated-carbon desulfurization device 52. Hence, $SO_3$ and ammonium sulfate, which were difficult to remove from the combustion exhaust gas heretofore, can be removed, and as a result, the emission of sulfur components into the atmosphere can be suppressed.

Accordingly, when a small amount of water is supplied to the activated-carbon desulfurization device 52, the sulfur components in the combustion exhaust gas can be removed by directly converting them into sulfuric acid. Hence, compared to the desulfurization method using a limestone slurry, the power consumption can be decreased. In addition, since a slurry is not brought into the system, the abrasion of the system can be suppressed.

Furthermore, since the sulfur components can be directly removed in the form of sulfuric acid, various salts of sulfuric acid may be obtained as by-products depending on the selected alkaline agent supplied.

The present invention is not limited to the above embodiments, and changes and modifications may be optionally made without departing from the scope and the sprit of the present invention.

What is claimed is:

1. An integrated coal gasification combined cycle system plant having:
    a coal gasifier configured to convert pulverized coal to a syngas;
    a gas turbine system which is operated by the syngas;
    a steam turbine system operated by steam generated by an exhaust heat recovery boiler to which a combustion exhaust gas of the gas turbine system is supplied,
    a power generator connected to at least one of the gas turbine system and the steam turbine system; and
    a recovery equipment which is located between the coal gasifier and the gas turbine system, and which is configured to be operated at the temperature less than 400° C. to recover at least char contained in the syngas and to supply the char recovered to the coal gasifier,
    the integrated coal gasification combined cycle system plant being of flue-gas-desulfurization-type, by which the combustion exhaust gas discharged from the exhaust heat recovery boiler is desulfurized before emitted into the atmosphere,
    wherein the integrated coal gasification combined cycle system plant comprises
    a desulfurization device configured to desulfurize the combustion exhaust gas discharged from the exhaust heat recovery boiler to recover a sulfur component; and
    a wet-type electric precipitator configured to recover a sulfur component and dust from the combustion exhaust gas discharged from the desulfurization device.

2. The integrated coal gasification combined cycle system plant according to claim 1, further comprising a fan which sucks the combustion exhaust gas discharged from the gas turbine system so as to emit the combustion exhaust gas into the atmosphere.

3. An integrated coal gasification combined cycle system plant having:
    a coal gasifier configured to convert pulverized coal to a syngas;
    a gas turbine system which is operated by the syngas;
    a steam turbine system operated by steam generated by an exhaust heat recovery boiler to which a combustion exhaust gas of the gas turbine system is supplied,
    a power generator connected to at least one of the gas turbine system and the steam turbine system; and
    a recovery equipment which is located between the coal gasifier and the gas turbine system, and which is configured to be operated at the temperature less than 400° C. to recover at least char contained in the syngas and to supply the char recovered to the coal gasifier,
    the integrated coal gasification combined cycle system plant being of flue-gas-desulfurization-type, by which the combustion exhaust gas discharged from the exhaust heat recovery boiler is desulfurized before emitted into the atmosphere,
        wherein the integrated coal gasification combined cycle system plant comprises a desulfurization device configured to desulfurize the combustion exhaust gas discharged from the exhaust heat recovery boiler to recover a sulfur component, and
    the desulfurization device includes activated carbon fibers.

4. The integrated coal gasification combined cycle system plant according to claim 3, further comprising a fan which sucks the combustion exhaust gas discharged from the gas turbine system so as to emit the combustion exhaust gas into the atmosphere.

* * * * *